United States Patent
Kitazono et al.

(10) Patent No.: US 11,123,638 B2
(45) Date of Patent: Sep. 21, 2021

(54) NON-TRANSITORY STORAGE MEDIUM HAVING STORED THEREIN INFORMATION PROCESSING PROGRAM, INFORMATION PROCESSING DEVICE, INFORMATION PROCESSING SYSTEM, AND INFORMATION PROCESSING METHOD

(71) Applicant: NINTENDO CO., LTD., Kyoto (JP)

(72) Inventors: Yusuke Kitazono, Kyoto (JP); Yasuhiko Matsuzaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 15/433,351

(22) Filed: Feb. 15, 2017

(65) Prior Publication Data
US 2017/0354885 A1    Dec. 14, 2017

(30) Foreign Application Priority Data

Jun. 10, 2016  (JP) .............................. JP2016-116046

(51) Int. Cl.
*A63F 13/00* (2014.01)
*A63F 13/5372* (2014.01)
(Continued)

(52) U.S. Cl.
CPC .......... *A63F 13/5372* (2014.09); *A63F 13/47* (2014.09); *A63F 13/52* (2014.09); *A63F 13/58* (2014.09); *A63F 13/822* (2014.09)

(58) Field of Classification Search
CPC .......... A63F 2300/807; A63F 2300/005; A63F 2300/822; A63F 2300/65
See application file for complete search history.

(56) References Cited

U.S. PATENT DOCUMENTS

| 7,386,799 | B1 | 6/2008 | Clanton et al. |
| 2007/0163427 | A1* | 7/2007 | Rigopulos ............... A63F 13/00 84/609 |

(Continued)

FOREIGN PATENT DOCUMENTS

| JP | 2004-141435 | 5/2004 |
| JP | 2004-187927 | 7/2004 |

(Continued)

OTHER PUBLICATIONS https://www.youtube.com/watch?v=mnKSCE9xwY8&list=PLzv7eKN1FqVfX5fsSLI9xl1Fe_Y9bywH Dynasty Warriors 6 (Year: 2016).*

(Continued)

*Primary Examiner* — Omkar A Deodhar
*Assistant Examiner* — Eric M Thomas
(74) *Attorney, Agent, or Firm* — Nixon & Vanderhye, P.C.

(57) ABSTRACT

A game device includes: a first determination unit which determines a first condition that the NPC inside a virtual space is present in the azimuth range set using the PC as the reference inside the virtual space; a second determination unit which determines a second condition that the NPC inside the virtual space has a predetermined positional relationship with the PC; a processing target decision unit which decides an NPC as a processing target when there is the NPC that satisfies both the first condition and the second condition and decides an NPC that satisfies the second condition as the processing target when there is no NPC that satisfies both the first condition and the second condition; and an information processing unit which performs information processing with respect to the decided NPC.

20 Claims, 16 Drawing Sheets

(51) Int. Cl.
  *A63F 13/52*  (2014.01)
  *A63F 13/47*  (2014.01)
  *A63F 13/58*  (2014.01)
  *A63F 13/822*  (2014.01)

(56) References Cited

U.S. PATENT DOCUMENTS

| | | | |
|---|---|---|---|
| 2007/0206003 A1* | 9/2007 | Yoshida | G06T 15/00 345/419 |
| 2007/0265045 A1* | 11/2007 | Takai | A63F 13/537 463/8 |
| 2010/0169796 A1 | 7/2010 | Lynk et al. | |
| 2010/0248804 A1 | 9/2010 | Matsumaru | |
| 2015/0286276 A1 | 10/2015 | Harrell, Jr. | |

FOREIGN PATENT DOCUMENTS

| | | |
|---|---|---|
| JP | 2011-215886 | 10/2011 |
| JP | 2013-232205 | 11/2013 |
| WO | WO 99/42917 | 8/1999 |

OTHER PUBLICATIONS

Extended European Search Report dated Jul. 17, 2017, issued in corresponding EP application No. 17156262.2 (8 pages).
Office Action—Notice of Reasons for Refusal dated Apr. 7, 2020, issued in JP Application No. 2016-116046 (3 pages) and English Translation (3 pages).
Japanese Office Action dated Jun. 15, 2021 for Application No. JP 2016-116046, 12 pages.

\* cited by examiner

NON-TRANSITORY STORAGE MEDIUM HAVING STORED THEREIN INFORMATION PROCESSING PROGRAM, INFORMATION PROCESSING DEVICE, INFORMATION PROCESSING SYSTEM, AND INFORMATION PROCESSING METHOD

CROSS REFERENCE TO RELATED APPLICATION

This nonprovisional application is based on Japanese Patent Application No. 2016-116046 filed with the Japan Patent Office on Jun. 10, 2016, the entire contents of which are hereby incorporated by reference.

FIELD

The present disclosure relates to a non-transitory storage medium, an information processing device, an information processing system, and an information processing method to allow a user to operate an object.

BACKGROUND AND SUMMARY

Conventionally, information processing systems, which execute a game and the like by operating objects inside a virtual space, have been known. The objects include an object that is operated by a user as a player (hereinafter, referred to as a "player object") and an object other than the player object (referred to as a "non-player object"). For example, characters imitating a person or an animal appears as the objects in the virtual space provided by the information processing systems. Hereinafter, the character as the player object will be referred to as a "player character" or a "PC", and the character as the non-player object will be referred to as a "non-player character" or an "NPC".

In the game such as a role-playing game, the NPC is controlled by the information processing system or other users. The PC can move inside the virtual space according to the user's operation. In addition, there is a case where it is devised such that the PC can have pseudo-conversation with the NPC when the PC and the NPC approach each other (for example, see JP 2004-141435 A).

An object of the present disclosure is to provide an information processing system which increases a chance to perform information processing with respect to an NPC while removing unnaturalness.

A non-transitory storage medium has stored therein an information processing program causing a computer of an information processing device to perform: first determination of determining whether a non-player object inside a virtual space satisfies a first condition that the non-player object is present in a direction set using a player object inside the virtual space as a reference; processing target decision of deciding a non-player object that satisfies the first condition as a processing target when there is the non-player object that satisfies the first condition and deciding a non-player object that does not satisfy the first condition as the processing target when there is no non-player object that satisfies the first condition; and information processing of performing predetermined information processing with respect to the non-player object decided as the processing target.

According to this configuration, it is possible to remove unnaturalness caused when the information processing is performed with respect to a non-player object that is not in the direction by deciding a non-player object as the processing target when the non-player object is present in the direction set using the player object as the reference, and it is possible to increase a chance to perform the information processing with respect to the non-player object by allowing the non-player object that is not in the direction set using the player object as the reference to be decided as the processing target when there is no non-player object in the direction set using the player object as the reference.

In the exemplary embodiment, the first determination may determine whether a first condition that the non-player object is present in a range, which is changed depending on a change of a direction of the player object, is satisfied. According to this configuration, when the direction of the player object is changed, the range is also changed depending on such a change, and thus, to perform the information processing with respect to the processing target becomes more natural.

In the exemplary embodiment, the direction may be set to the front of the player object. According to this configuration, the non-player object in front of the player object is set as the processing target, and thus, to perform the information processing with respect to the non-player object becomes more natural.

In the exemplary embodiment, the information processing program may further cause the computer of the information processing device to perform second determination of determining whether a non-player object inside the virtual space satisfies a second condition of having a predetermined positional relationship with the player object. The processing target decision may decide a non-player object that satisfies both the first condition and the second condition as the processing target.

According to this configuration, the processing target decision decides a non-player object that satisfies the first condition and the second condition when there is the non-player object that satisfies both the first condition and the second condition and decides a non-player object that does not satisfy the first condition but satisfies the second condition as the processing target when there is no non-player object that satisfies the first condition. It is possible to decide the processing target based on the positional relationship with the player object as well as simply the presence or absence in the direction set using the player object as the reference.

In the exemplary embodiment, the predetermined positional relationship may be a relationship that the player object is present in a predetermined area set around the non-player object. According to this configuration, the positional relationship is set around the non-player object, and thus, the player object can perform the information processing with respect to a non-player object by approaching the non-player object.

In the exemplary embodiment, there are a plurality of the non-player objects and the predetermined area may be set individually for each of the plurality of non-player objects. As described above, the positional relationship is not set to the player object but set to the non-player object, and thus, it is unnecessary to uniformly set the positional relationship as the second condition for all the plurality of non-player objects, but it is possible to individually set the positional relationship.

In the exemplary embodiment, when there are a plurality of non-player objects that satisfy the first condition, the processing target decision may decide a non-player object having a closest distance from the player object among the non-player objects that satisfy the first condition as the processing target. According to this configuration, it is possible to perform the information processing with respect to the single non-player object having the closest distance from the player object.

In the exemplary embodiment, when there is no non-player object that satisfies the first condition and there are a plurality of non-player objects that do not satisfy the first condition, the processing target decision may decide a non-player object having a closest distance from the player object among the non-player objects that do not satisfy the first condition as the processing target. According to this configuration, it is possible to perform the information processing with respect to the single non-player object having the closest distance from the player object for the non-player object that does not satisfy the first condition.

In the exemplary embodiment, the predetermined information processing may be to output information to be displayed in addition to the non-player object as the processing target. In addition, the information may relate to pseudo-conversation between the player object and the non-player object as the processing target, and to be more specific, may indicate the possibility of the pseudo-conversation.

In the exemplary embodiment, whether to be preferentially set as the processing target may be decided for the non-player object, and when there is a non-player object to be preferentially decided as the processing target, the processing target decision may decide the non-player object as the processing target regardless of whether the first condition is satisfied. According to this configuration, it is possible to set the non-player object to be preferentially decided as the processing target.

Another non-transitory storage medium has stored therein an information processing program causing a computer of an information processing device to perform: first determination of determining whether a non-player object inside a virtual space satisfies a first condition that the non-player object is present in a direction set using a player object inside the virtual space as a reference; second determination of determining whether a non-player object inside the virtual space satisfies a second condition that the non-player object has a predetermined positional relationship with the player object; processing target decision of deciding a non-player object that satisfies both the first condition and the second condition as a processing target when there is the non-player object that satisfies both the first condition and the second condition and decides a non-player object that satisfies the second condition as the processing target when there is no non-player object that satisfies both the first condition and the second condition; and information processing of performing predetermined information processing with respect to the non-player object decided as the processing target.

According to this configuration, it is possible to preferentially set the non-player object that also satisfies the first condition on the premise that the second condition is satisfied as the processing target, and to set the non-player object that does not satisfy the first condition as the processing target when there is no non-player object that satisfies the first condition.

An information processing device includes: a first determination unit which determines whether a non-player object inside a virtual space satisfies a first condition that the non-player object is present in a direction set using a player object inside the virtual space as a reference; a processing target decision unit which decides a non-player object that satisfies the first condition as a processing target when there is the non-player object that satisfies the first condition and deciding a non-player object that does not satisfy the first condition as the processing target when there is no non-player object that satisfies the first condition; and an information processing unit which performs predetermined information processing with respect to the non-player object decided as the processing target.

According to this configuration, it is also possible to remove unnaturalness caused when the information processing is performed with respect to a non-player object that is not in the direction by deciding a non-player object as the processing target when the non-player object is present in the direction set using the player object as the reference, and it is possible to increase the chance to perform the information processing with respect to the non-player object by allowing the non-player object that is not in the direction set using the player object as the reference to be decided as the processing target when there is no non-player object in the direction set using the player object as the reference.

An information processing system includes: a first determination unit which determines whether a non-player object inside a virtual space satisfies a first condition that the non-player object is present in a direction set using a player object inside the virtual space as a reference; a processing target decision unit which decides a non-player object that satisfies the first condition as a processing target when there is the non-player object that satisfies the first condition and deciding a non-player object that does not satisfy the first condition as the processing target when there is no non-player object that satisfies the first condition; and an information processing unit which performs predetermined information processing with respect to the non-player object decided as the processing target.

According to this configuration, it is also possible to remove unnaturalness caused when the information processing is performed with respect to a non-player object that is not in the direction by deciding a non-player object as the processing target when the non-player object is present in the direction set using the player object as the reference, and it is possible to increase the chance to perform the information processing with respect to the non-player object by allowing the non-player object that is not in the direction set using the player object as the reference to be decided as the processing target when there is no non-player object in the direction set using the player object as the reference.

An information processing method performs: first determination of determining whether a non-player object inside a virtual space satisfies a first condition that the non-player object is present in a direction set using a player object inside the virtual space as a reference; processing target decision of deciding a non-player object that satisfies the first condition as a processing target when there is the non-player object that satisfies the first condition and deciding a non-player object that does not satisfy the first condition as the processing target when there is no non-player object that satisfies the first condition; and predetermined information processing with respect to the non-player object decided as the processing target.

According to this configuration, it is also possible to remove unnaturalness caused when the information processing is performed with respect to a non-player object that is not in the direction by deciding a non-player object as the processing target when the non-player object is present in the direction set using the player object as the reference, and it is possible to increase the chance to perform the information processing with respect to the non-player object by allowing the non-player object that is not in the direction set using the player object as the reference to be decided as the processing target when there is no non-player object in the direction set using the player object as the reference.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Hereinafter, an embodiment of the present disclosure will be described with reference to the drawings. Incidentally, the embodiment to be described hereinafter is given to illustrate examples of the case of embodying the present disclosure and there is no intention to limit the present invention to the specific configuration to be described hereinafter. A specific configuration according to an embodiment may be appropriately adopted when embodying the present disclosure.

Figure 1:
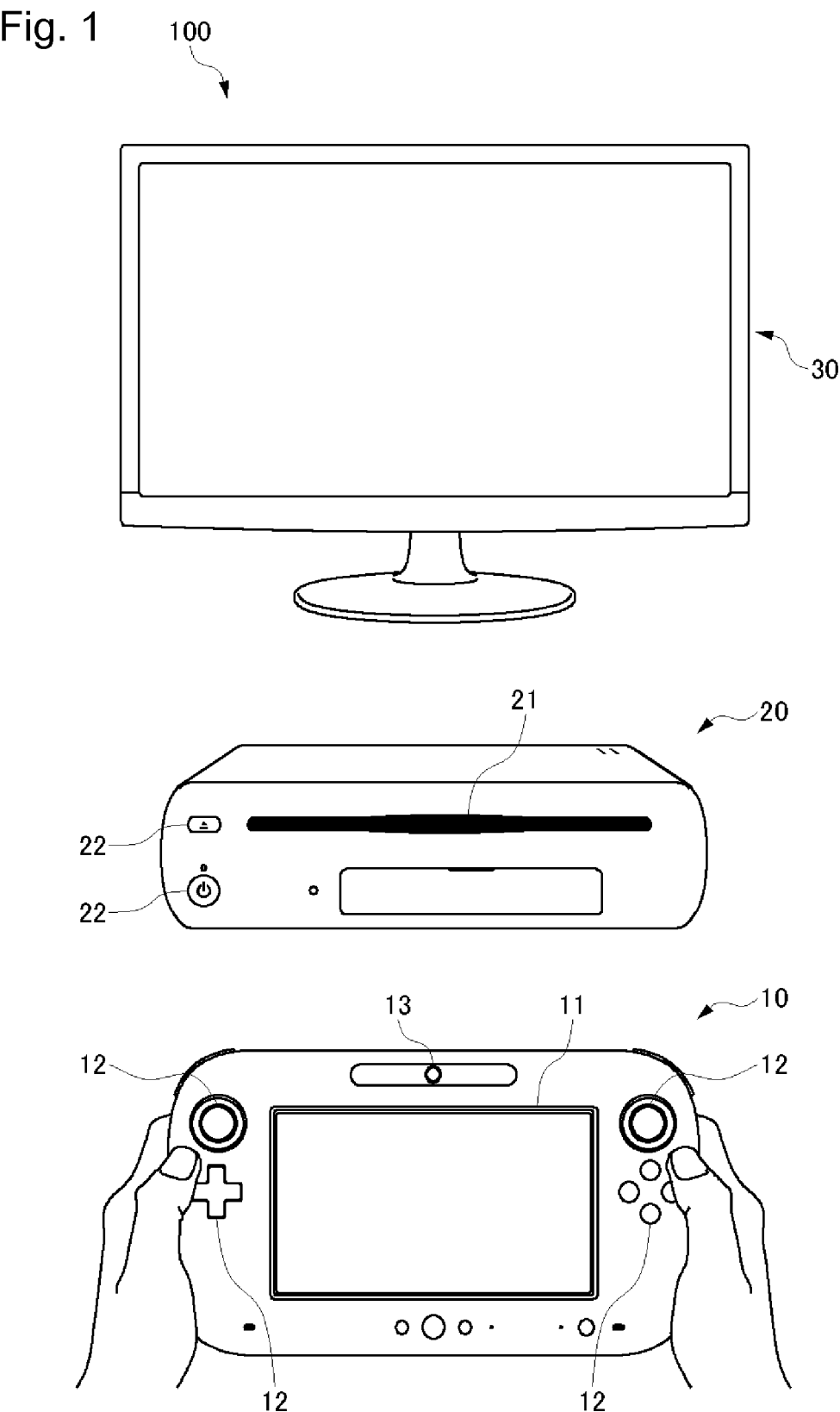
FIG. 1 is an exterior view of a game system according to an embodiment.

FIG. 1 is a diagram illustrating an exterior configuration of an information processing system according to the embodiment. In the present embodiment, the information processing system is configured as a game system 100 which executes game processing as information processing. The game system 100 includes a controller 10, a game device (main body) 20 as an information processing device, and a display device 30. Data is transmitted and received between the controller 10 and the game device 20 through wireless communication. In addition, the game device 20 is connected to the display device 30 via a cable and transmits data of a game screen to the display device 30.

As illustrated in FIG. 1, the controller 10 is configured to be taken by a user's hand for operation. The controller 10 has a pad-like (plate-like) shape and includes a controller screen 11 at the center thereof, and operating members 12 such as a button and a stick around the controller screen 11. Each of the operating members 12 is arranged at a position that can be operated by fingers of the user's both hands when the controller 10 is held by the both hands so that the controller screen 11 is facing the user.

The controller screen 11 is configured also as a touch panel so that the user can perform various inputs through a touch operation with respect to the controller screen 11. In addition, the controller 10 also includes a camera 13.

The game device 20 has a schematically rectangular shape and includes a slot 21 for a recording medium, various buttons 22, and various terminals (not illustrated). It is possible to use a TV monitor which has a terminal for connection with the game device 20 as the display device 30.

Figure 2:
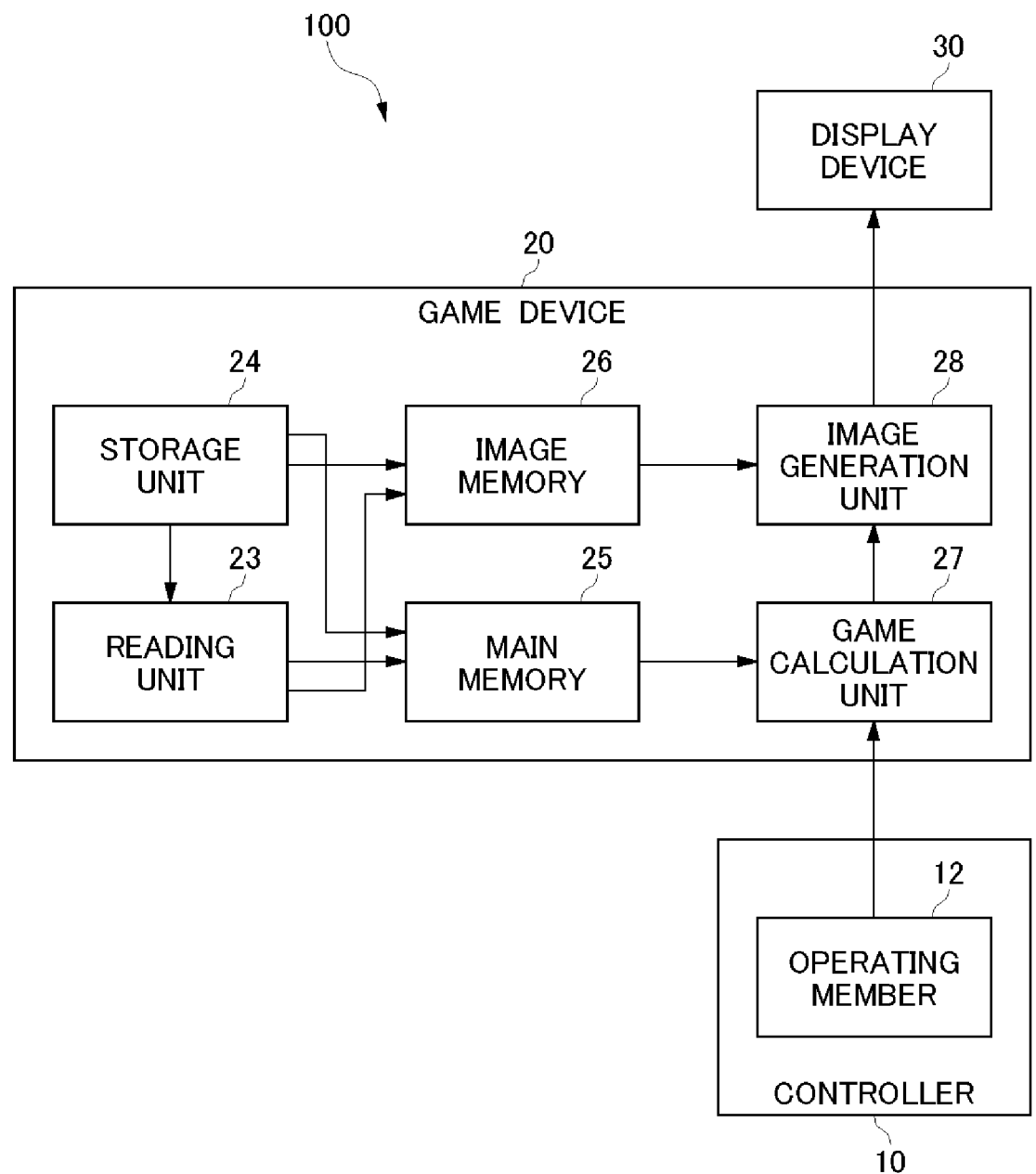
FIG. 2 is a block diagram illustrating a configuration of a game system according to the embodiment.

FIG. 2 is a block diagram illustrating a configuration of the game system 100 according to the embodiment. FIG. 2 only illustrates components required for description of the present embodiment and do not illustrate other configurations. The controller 10 includes the operating members 12. Press of the button and inclination of the stick as operations of the operating members 12 are detected, and the detected input of the user is transmitted to the game device 20 as an input signal in a wireless manner.

The game device 20 includes a reading unit 23, a storage unit 24, a main memory 25, an image memory 26, a game calculation unit 27, and an image generation unit 28. The reading unit 23 reads data recorded in a recording medium (for example, a disk, a cartridge, and the like) which is inserted into the slot 21 for a recording medium. In the present embodiment, a game program and game data are recorded in the recording medium, and the reading unit 23 reads the both. The game data includes graphic information to depict a three-dimensional virtual space used in a game and objects (including a player object and a non-player object) present inside the space.

The reading unit 23 causes the game program and the game data read from the recording medium to be stored in the storage unit 24 or to be loaded in the main memory 25 and the image memory 26. The storage unit 24 stores the game program and the game data read by the reading unit 23. Incidentally, the game device 20 may have a network communication function to perform communication in the state of being connected to the internet, and the game program and the game data may be downloaded from a server via a network. In this case, the game program and the game data downloaded in this manner are stored in the storage unit 24.

The game calculation unit 27 performs the game processing based on the game program and the game data, and in this case, the game program and the game data are read from the recording medium by the reading unit 23 and loaded in the main memory 25 and the image memory 26 or read from the storage unit 24 and loaded in the main memory 25 and the image memory 26.

The game calculation unit 27 uses the main memory 25 for the game processing which is performed according to the game program. In addition, the image generation unit 28 generates an image (video) to be displayed in the display device 30 according to the game program and uses the image memory for this image generating process. Incidentally, the main memory 25 and the image memory 26 may be the same memory.

The game calculation unit 27 is a processor which performs a calculating process depending on the game data and the input signal from the controller 10 according to the game program. A result of the game processing in the game calculation unit 27 is passed to the image generation unit 28. The image generation unit 28 is a processor to generate the game image to be displayed in the display device 30 using the game data including the graphic information according to the result of the game processing. The game image generated in the image generation unit 28 is output to the display device 30. Incidentally, the game calculation unit 27 and the image generation unit 28 may be configured using the same processor or may be configured using processors different from each other.

When the game device 20 according to the present embodiment executes the game program according to the present embodiment, the game to operate the player object inside a three-dimensional virtual space is developed. In the game, a plurality of non-player objects are present in the virtual space.

The player object includes an object that can be operated by the input of the user serving as a player with respect to the controller 10, but is not limited thereto. In the game according to the present embodiment, the player object is set to be a living thing and expressed as a character, and accordingly, can be referred to as a player character.

In addition, the non-player object includes an object that act depending on development of the game or a behavior of the player object according to the game program or an operation performed by another player, but is not limited thereto. In the game according to the present embodiment, the non-player object is also set to be a living thing and expressed as a character, and accordingly, can be referred to as a non-player character. Hereinafter, the player object will be referred to as the player character (PC), and the non-player object will be referred to as the non-player character (NPC). The PC and the NPC according to the present embodiment are characters who can face the front, the back or the like, and a gaze direction thereof, for example, is defined as a front direction or the front.

In addition, the PC can move inside the virtual space according to the player's operation in the game according to the present embodiment, and it is possible to perform pseudo-conversation between the PC and a predetermined NPC by causing the PC to approach the predetermined NPC inside the virtual space. The pseudo-conversation includes two types, that is, simple conversation and normal conversation. Whether the NPC and the PC perform the simple conversation or the normal conversation is set for each NPC in advance. Instead of or in addition to this, whether the NPC and the PC perform the simple conversation or the normal conversation may be decided depending on the development of the game or the user's operation.

Figure 3:
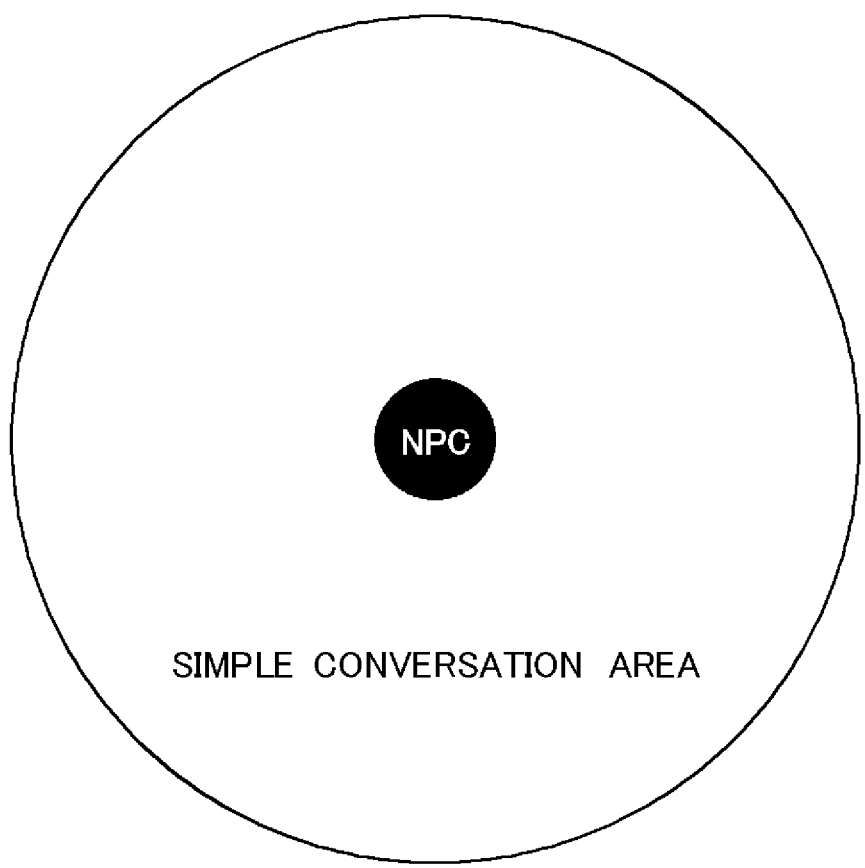
FIG. 3 is a diagram illustrating an example of a simple conversation area to perform simple conversation according to the embodiment.
Figure 4:
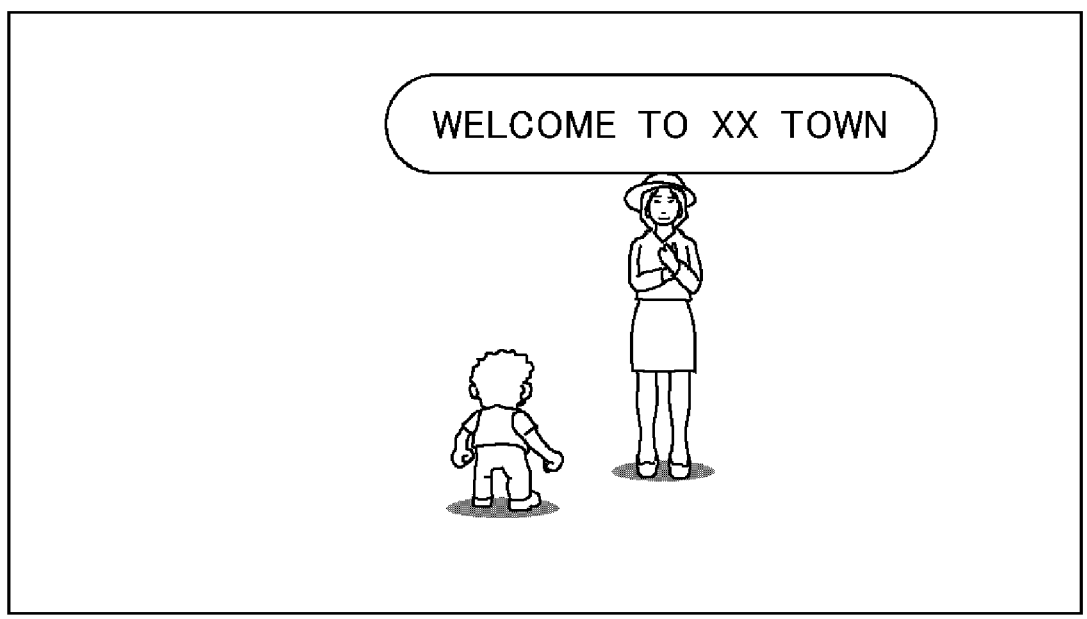
FIG. 4 is a diagram illustrating an example of a game screen in a state where the simple conversation is being performed according to the embodiment.

FIG. 3 is a diagram illustrating an example of a simple conversation area to perform the simple conversation, and FIG. 4 is a diagram illustrating an example of the game screen in a state where the simple conversation is being performed. As illustrated in FIG. 3, the simple conversation area is set around the NPC. To be specific, the simple conversation area is set as an area inside a circle having a predetermined radius with the NPC as the center thereof. In the simple conversation, when the PC approaches an NPC and enters the simple conversation area of the NPC, an utterance balloon is displayed in the form of being added to a graphic of the NPC close to the graphic of the NPC. The content of the utterance of the NPC is indicated in letters inside the utterance balloon.

Figure 5:
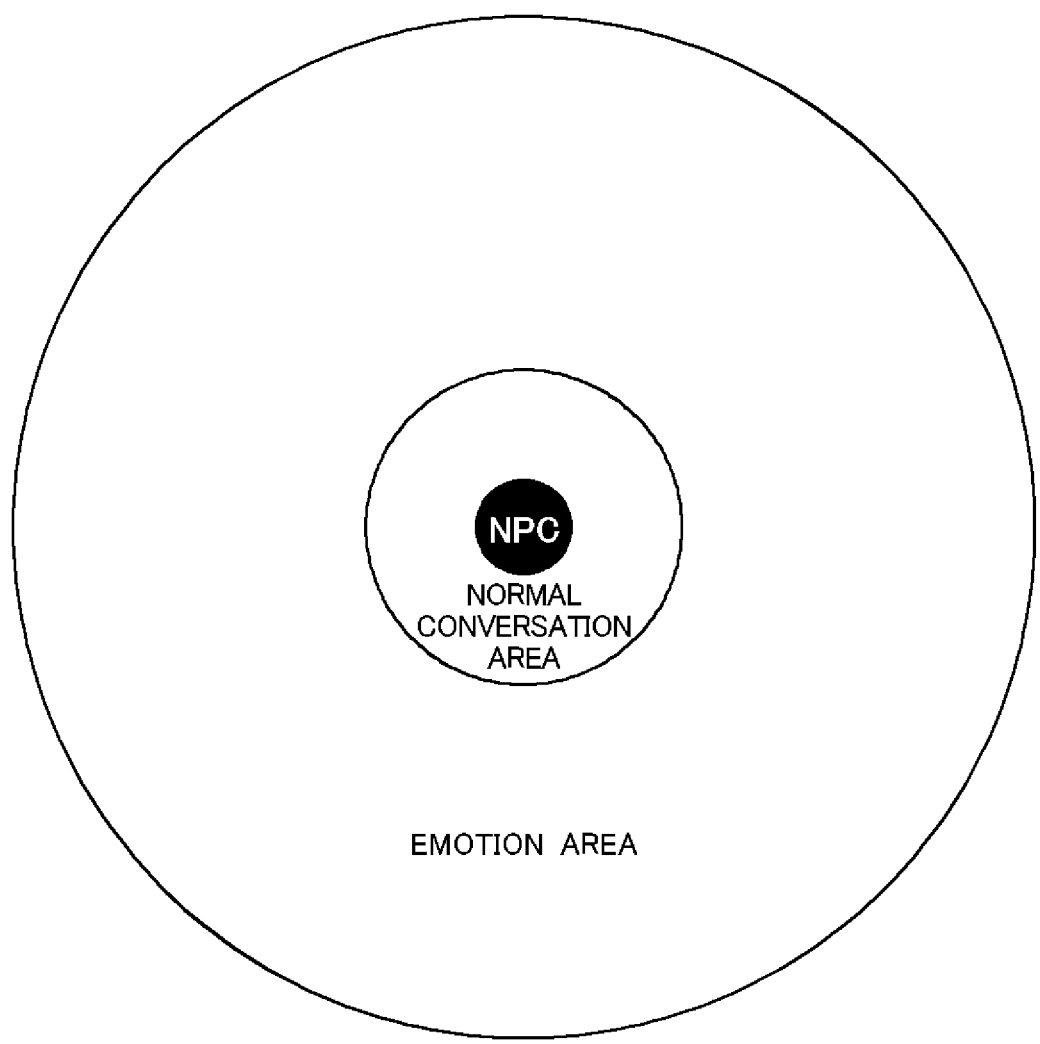
FIG. 5 is a diagram illustrating examples of an emotion area and a normal conversation area to perform normal conversation area according to the embodiment.
Figure 6:
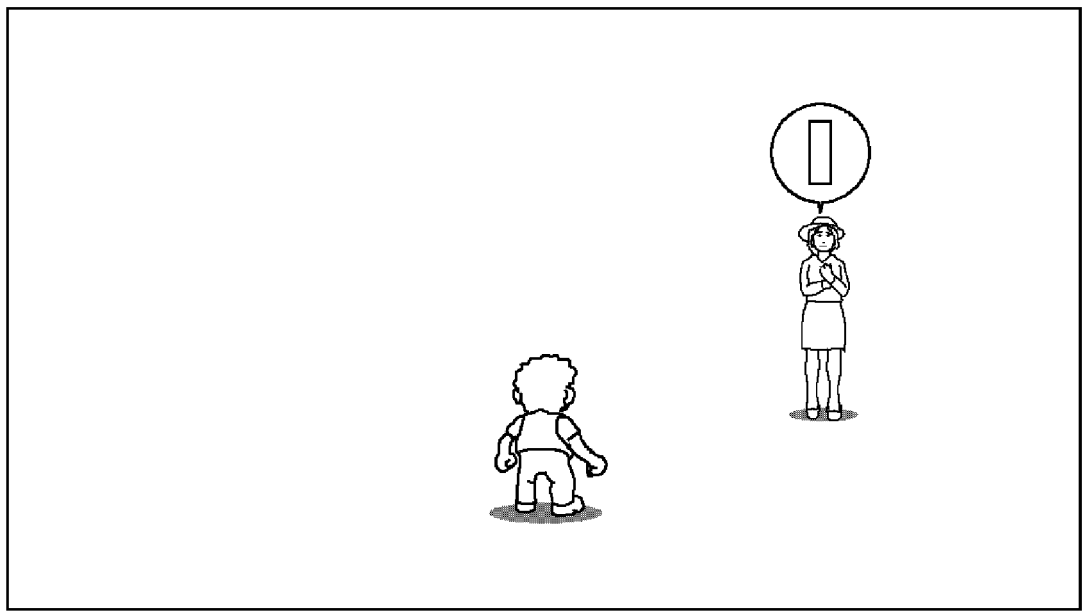
FIG. 6 is a diagram illustrating an example of a game screen in a state where an emotion balloon is displayed according to the embodiment.
Figure 7:
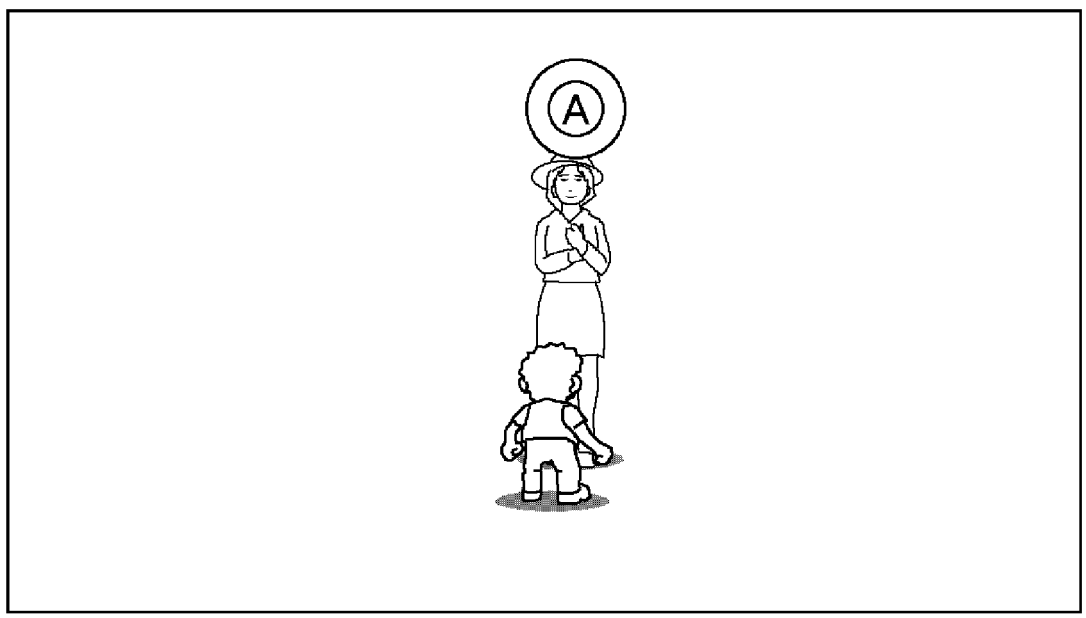
FIG. 7 is a diagram illustrating an example of a game screen in a state where an operation-instructing balloon is displayed according to the embodiment.

FIG. 5 is a diagram illustrating examples of an emotion area and a normal conversation area to perform the normal conversation, FIG. 6 is a diagram illustrating an example of the game screen in a state where an emotion balloon is displayed, and FIG. 7 is a diagram illustrating an example of the game screen in a state where an operation-instructing balloon is displayed. As illustrated in FIG. 5, the normal conversation area is set around the NPC, and the emotion area is set outside the normal conversation area. That is, the plurality of areas having different sizes are set around the NPC. To be specific, the normal conversation area is set as an area inside a circle having a predetermined radius with the NPC as the center thereof, and the emotion area is set as a perforated area inside a circle having a radius larger than the radius of the normal conversation area having the NPC as the center thereof while excluding the normal conversation area.

When the PC approaches an NPC to some extent and enters the emotion area, the emotion balloon is displayed in the form of being added to a graphic of the NPC close to the graphic of the NPC as illustrated in FIG. 6. A mark indicating emotion of the NPC is indicated inside the emotion balloon. When the PC further approaches the NPC and enters the normal conversation area, the operation-instructing balloon is displayed in the form of being added to the graphic of the NPC close to the graphic of the NPC as illustrated in FIG. 7. A mark, which instructs an operation that needs to be performed by the user in order to start the normal conversation ("A" which instructs to press a button A in the example of FIG. 7), is indicated inside the operation-instructing balloon.

Figure 8:
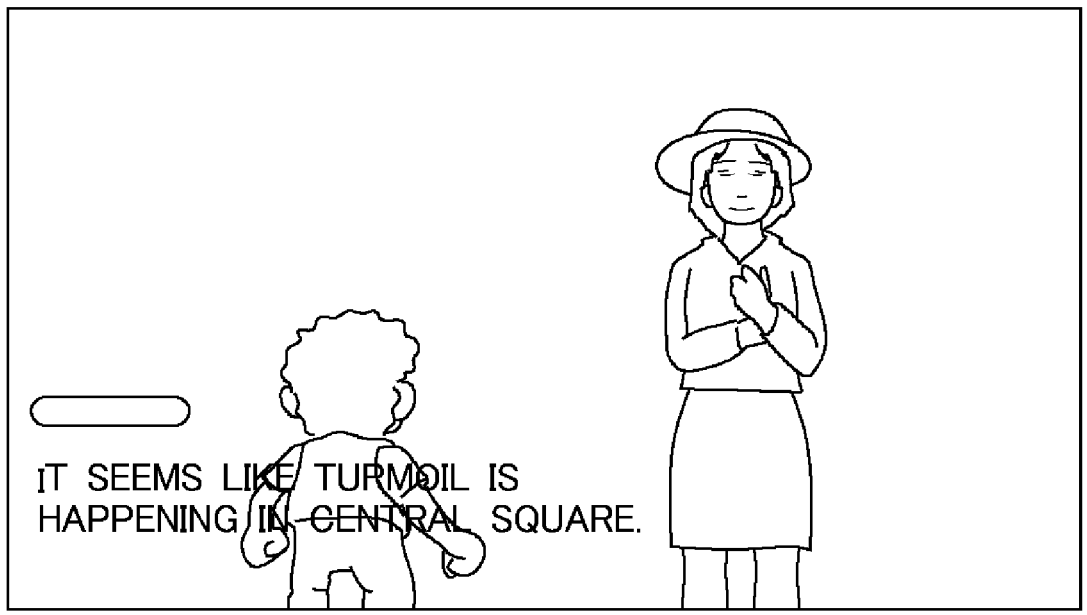
FIG. 8 is a diagram illustrating an example of a game screen in a state where the normal conversation is being performed according to the embodiment.

FIG. 8 is a diagram illustrating an example of the game screen in a state where the normal conversation is being performed. When the user operates the controller 10 according to the operation instruction indicated by the operation-instructing balloon in the game screen illustrated in FIG. 7, the normal conversation starts as illustrated in FIG. 8. In the normal conversation, the utterance content of the NPC is indicated in letters at the bottom of the game screen as illustrated in FIG. 8. The utterance content may be indicated at the top of the game screen.

Figure 9:
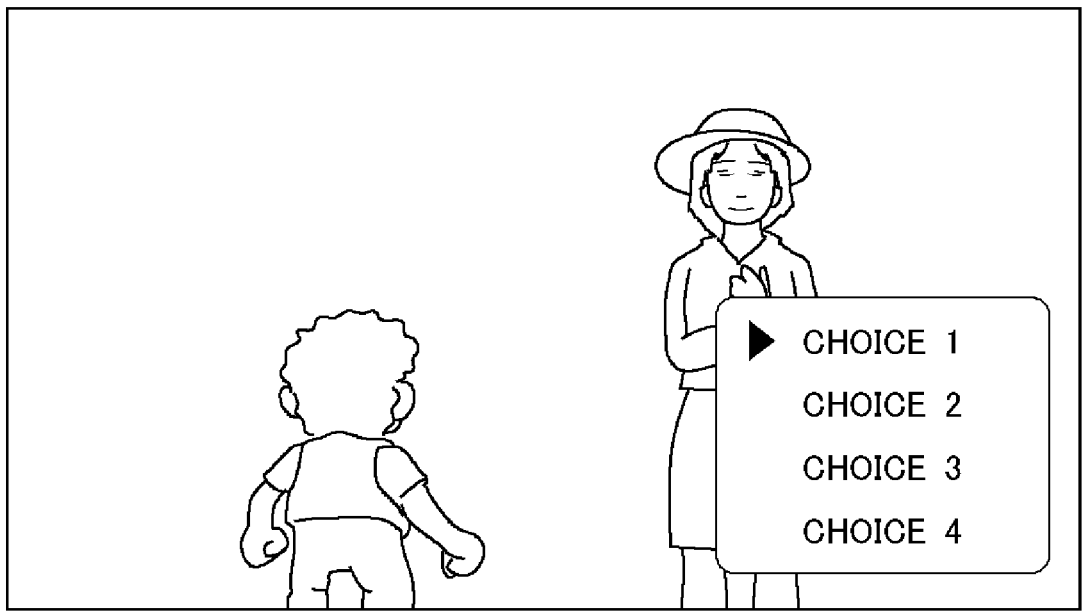
FIG. 9 is a diagram illustrating an example of a game screen in a state where a PC makes utterance according to the embodiment.

FIG. 9 is a diagram illustrating an example of the game screen in a state where the PC makes utterance. In the simple conversation and the normal conversation, the PC can make utterance depending on the utterance content of the NPC. As illustrated in FIG. 9, the user can instruct the content of the utterance of the PC by selecting the utterance content among choices. As a modified example, the user may instruct the utterance content of the PC through test input or voice input or the PC may be configured to utter the utterance content set in advance.

Hereinafter, a description will be given regarding a configuration of the game device 20 to enable the PC to perform the pseudo-conversation when approaching the NPC as described above. Incidentally, each process of displaying the utterance balloon (see FIG. 4), the emotion balloon (see FIG. 6), and the operation-instructing balloon (see FIG. 7) and each configuration to perform the process are prepared in the game device 20, but only types of the balloons (the utterance balloon, the emotion balloon, and the operation-instructing balloon) and the areas (the simple conversation area, the emotion area, and the normal conversation area) set to display the balloons are different from each other in the respective processes. Thus, the utterance balloon, the emotion balloon, and the operation-instructing balloon will be collectively referred to as the "balloon", the simple conversation area, the emotion area, and the normal conversation area will be collectively referred to as a "balloon display area", and a process of displaying the balloon in the game device 20 will be described, hereinafter.

Figure 10:
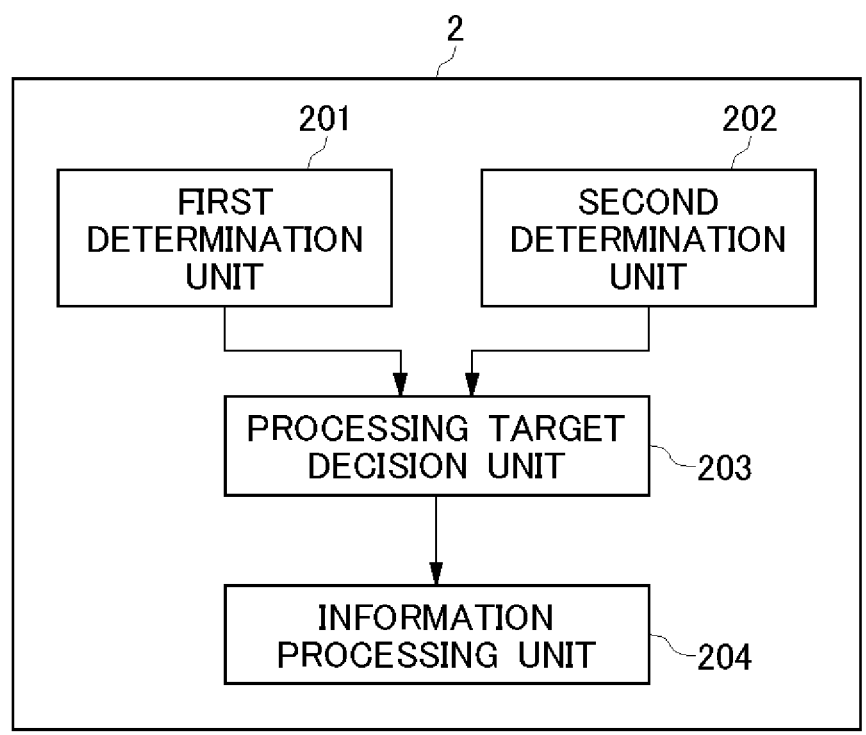
FIG. 10 is a block diagram illustrating a functional configuration of a game device according to the embodiment.

FIG. 10 is a block diagram illustrating a functional configuration of the game device 20. The game device 20 includes at least a first determination unit 201, a second determination unit 202, a processing target decision unit 203, and an information processing unit 204. The respective components are functions that are realized in the game device 20 when the game calculation unit 27 of the game device 20 executes the game according to the present embodiment program. Incidentally, all these configurations are not necessarily provided in the single game device 20 but may be distributed into a plurality of devices, and a game system may be configured using the plurality of devices.

The first determination unit 201 determines whether a first condition that the NPC is present inside an azimuth range set using the PC as a reference is satisfied for each of NPCs inside the virtual space. To be specific, the azimuth range of 180 degrees which spreads right and left each at 90 degrees having the front direction (gaze direction) as the center thereof is set as a balloon display azimuth range for the PC. When the PC changes a direction in the virtual space, that is, the gaze direction, the balloon display azimuth range is changed depending on such a change. A fact that the first condition is set means that the balloon is displayed only for the NPC on a side that the PC faces.

The second determination unit 202 determines whether a second condition that the NPC has a predetermined positional relationship with the PC for each of NPCs inside the virtual space. To be specific, the second determination unit 202 determines whether the PC is present in each balloon display area for each of the NPCs. In other words, the second determination unit 202 determines whether the PC belongs to the balloon display area of any NPC.

The processing target decision unit 203 selects and decides a processing target among NPCs that satisfy the second condition based on the determination of the second determination unit 202. When there are a plurality of NPCs that satisfy the second condition and there are NPCs that satisfy the first condition based on the determination of the first determination unit 201, the processing target decision unit 203 selects and decides the processing target among NPCs that further satisfy the first condition among the NPCs that satisfy the second condition. In addition, when there are a plurality of NPCs that satisfy the second condition and there is no NPC that satisfies the first condition thereamong, the processing target decision unit 203 selects and decides the processing target among NPCs that satisfy the second condition and do not satisfy the first condition.

That is, the processing target decision unit 203 selects and decides the processing target among NPCs that satisfy the first condition when there are the NPCs that satisfy the first condition among the NPCs that satisfy the second condition, and selects and decides the processing target among NPCs that do not satisfy the first condition when there is no NPC that satisfies the first condition. In other words, the processing target decision unit 203 selects and decides the processing target among NPCs when there are the NPCs that satisfy both the first second and the second condition, selects and decides the processing target among NPCs when there is no NPC that satisfies both the first condition and the second condition and there are the NPCs that satisfy only the second condition, and does not select the processing target when there is no NPC that satisfies the second condition.

When there are a plurality of NPCs that satisfy both the first second and the second condition, the processing target decision unit 203 selects and decides an NPC having the closes distance from the PC among the NPCs as the processing target. When there is no NPC that satisfies both the first condition and the second condition and there are a plurality of NPCs that satisfy only the second condition, the processing target decision unit 203 also selects and decides an NPC having the closes distance from the PC among the NPCs as the processing target.

The information processing unit 204 performs the information processing with respect to the NPC as the processing target decided by the processing target decision unit 203. As described above, the information processing performed with respect to the NPC is the processing to display the balloon close to the NPC, and to be specific, is the processing to output information to the display device 30 for such display.

Figure 11:
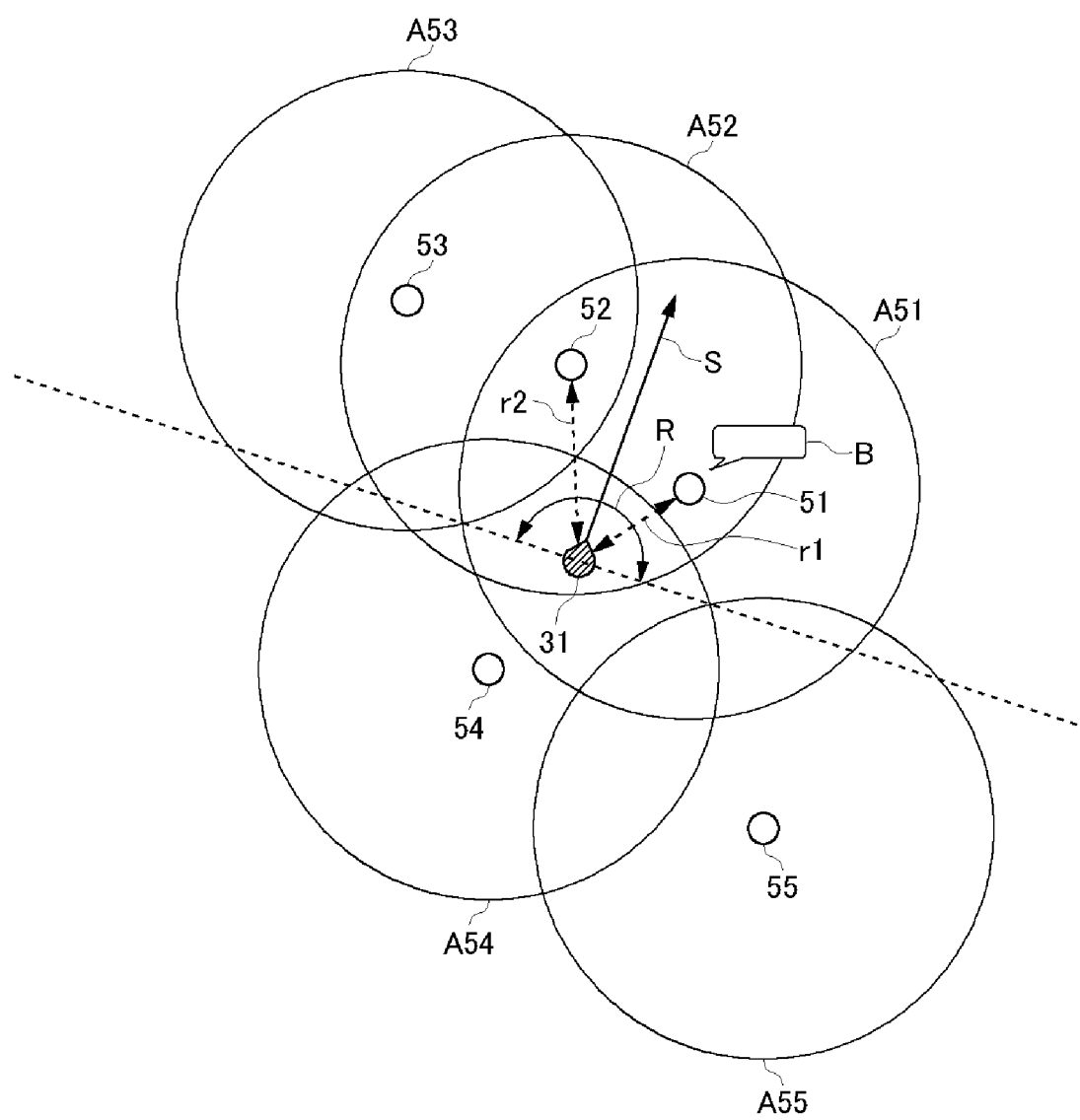
FIG. 11 is a diagram illustrating an example of a relationship among a balloon display area, a balloon display azimuth range, and a balloon to be displayed according to the embodiment.

FIG. 11 is a diagram illustrating an example of a relationship among the balloon display area, the balloon display azimuth range, and the balloon to be displayed. In the example of FIG. 11, five NPCs 51 to 55 are present around a PC 31. As described above, a gaze direction S is defined as the front direction for the PC 31. When the PC 31 changes its direction, the gaze direction S is changed depending on such a change. A balloon display azimuth range R is set at each 90 degrees on both the right and left sides (180 degrees in total) from the gaze direction is set for the PC 31. Balloon display areas A51 to A55 are set for the NPCs 51 to 55, respectively.

In the example of FIG. 11, the PC 31 is present in the balloon display area A51 set around the NPC 51, the balloon display area A52 set around the NPC 52, and the balloon display area A54 set around the NPC 54. In addition, the NPC 51, the NPC 52, and the NPC 53 are present in the balloon display azimuth range R set for the PC 31.

In this case, the first determination unit 201 determines that the NPC 51, the NPC 52, and the NPC 53 satisfy the first condition, and the second determination unit 202 determines that the NPC 51, the NPC 52, and the NPC 54 satisfy the second condition. Thus, the processing target decision unit 203 selects the processing target between the NPC 51 and the NPC 52 that also satisfy the first condition among the NPC 51, the NPC 52, and the NPC 54 that satisfy the second condition.

In this manner, there are the plurality of NPCs that satisfy both the first second and the second condition in in the example of FIG. 11, and thus, the processing target decision unit 203 selects and decides an NPC having the closest distance from the PC 31 between the NPC 51 and the NPC 52 that satisfy both the first condition and the second condition as the processing target. In the example of FIG. 11, a distance between the PC 31 and the NPC 51 is r1, a distance between the PC 31 and the NPC 52 is r2, and r1<r2. Thus, the NPC 51 is closer to the PC 31, and accordingly, the processing target decision unit 203 selects and decides the NPC 51 as the processing target.

The information processing unit 204 displays a balloon B in the form of being added to the graphic of the NPC 51 as the processing target decided by the processing target decision unit 203 as illustrated in FIG. 11.

Figure 12:
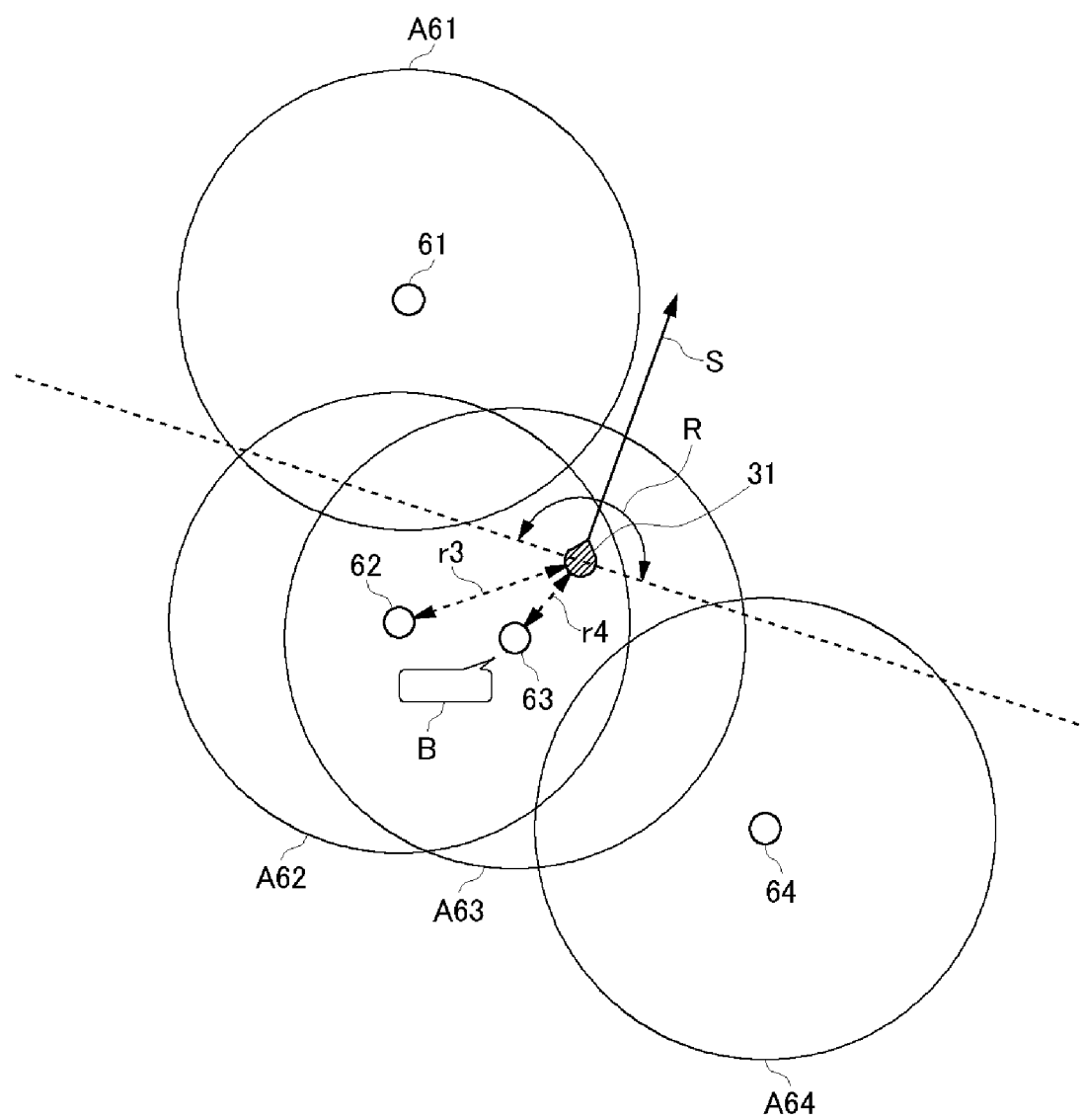
FIG. 12 is a diagram illustrating an example of the relationship among the balloon display area, the balloon display azimuth range, and the balloon to be displayed according to the embodiment.

FIG. 12 is a diagram illustrating another example of the relationship among the balloon display area, the balloon display azimuth range, and the balloon to be displayed. In the example of FIG. 12, four NPCs 61 to 64 are present around the PC 31. Balloon display areas A61 to A64 are set for the NPCs 61 to 64, respectively.

In the example of FIG. 12, the PC 31 is present in the balloon display area A62 set around the NPC 62 and the balloon display area A63 set around the NPC 63. In addition, the NPC 61 is present in the balloon display azimuth range R set for the PC 31. In this case, the first determination unit 201 determines that the NPC 61 satisfies the first condition, and the second determination unit 202 determines that the NPC 62 and the NPC 63 satisfy the second condition. That is, there is no NPC that satisfies the first condition among the NPC 62 and the NPC 63 that satisfy the second condition in the example of FIG. 12, and in other words, there is no NPC that satisfies both the first condition and the second condition.

In this case, the processing target decision unit 203 selects and decides the processing target among the NPC 62 and the NPC 63 that satisfy the second condition (but do not satisfy the first condition). The processing target decision unit 203 selects and decides an NPC having a distance closer to the PC 31 as the processing target since there are the two NPCs that satisfy the second condition. In the example of FIG. 12, a distance from the PC 31 to the NPC 62 is r3, a distance from the PC 31 to the NPC 63 is r4, and r3>r4. Thus, the processing target decision unit 203 selects and decides the NPC 63 which is closer to the PC 31 as the processing target.

Next, priority setting will be described. As described above, the processing target decision unit 203 according to the present embodiment selects the processing target based on the first condition, the second condition, and the distance from the PC, and whether to be preferentially decided as the processing target is set for the NPC so that the processing target decision unit 203 preferentially decides the NPC set with the priority as the processing target regardless of some or all of the first condition, the second condition, and the distance described above.

For example, the processing target decision unit 203 may preferentially decided the NPC set with the priority as the processing target regardless of the first condition and the distance while setting the second condition as a mandatory condition. In this case, the NPC set with the priority is preferentially decided as the processing target than other NPCs regardless of the first condition and the distance when satisfying the second condition. That is, an NPC is decided as the processing target as long as there is the PC inside a predetermined range based on the NPC even if the NPC is not present on the side in the gaze direction of the PC.

Figure 13:
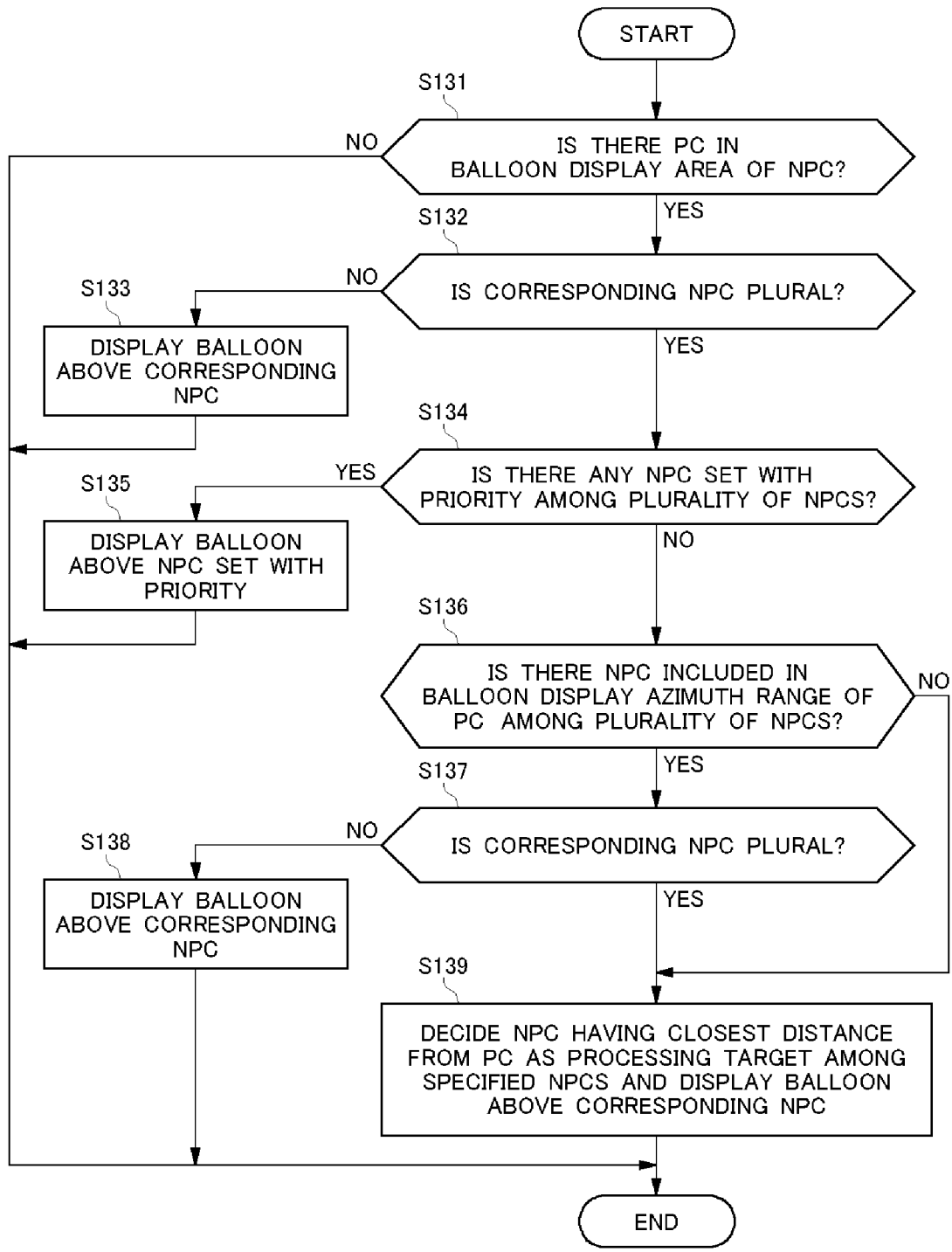
FIG. 13 is a flow diagram of a game processing method according to the embodiment.

FIG. 13 is a flow diagram of an information processing method (game processing method) to be executed by the game according to the present embodiment device 20. Incidentally, the flow diagram of FIG. 13 is illustrative, and modifications such as replacement of a processing procedure and omission of some steps can be made. In the game processing method of FIG. 13, first, the second determination unit 202 determines whether there is the PC in the balloon display area, that is, whether the second condition is satisfied for each NPC (Step S131). When there is no NPC including the PC in the balloon display area, (NO in Step S131), the process is ended. That is, no NPC is set as the processing target, and as a result, the balloon is not displayed for any NPC.

When there is an NPC including the PC in the balloon display area (YES in Step S131), that is, when the PC is present in the balloon display area of any NPC, the processing target decision unit 203 specifies the NPC. Next, the processing target decision unit 203 determines whether the NPC specified in this manner is plural (Step S132), and when there is only one NPC (NO in Step S132), the NPC is decided as the processing target, the information processing unit 204 displays the balloon above the NPC (Step S133).

When there are the plurality of NPCs including the PC in the balloon display area (YES in Step S132), the processing target decision unit 203 determines whether there is an NPC set with the priority among the plurality of NPCs (Step S134). In this manner, the NPC that satisfies the second condition is preferentially processed, and the NPC that does not satisfy the second condition even if being set with the priority is not selected as the processing target in the present embodiment. When there is an NPC set with the priority, the processing target decision unit 203 decides the NPC set with the priority as the processing target, and the information processing unit 204 displays the balloon above the NPC (Step S135).

When there is no NPC set with the priority (NO in Step S134), the processing target decision unit 203 determines whether there is an NPC included in the balloon display azimuth range of the PC among the plurality of NPCs including the PC in the balloon display area, that is, whether the first condition is satisfied (Step S136). When there is such an NPC (YES in Step S136), the processing target decision unit 203 specify the NPC and determines whether the NPC is plural (Step S137).

When there is only one corresponding NPC (NO in Step S137), the processing target decision unit 203 decides the NPC as the processing target, and the information processing unit 204 displays the balloon above the NPC (Step S138). When there are the plurality of NPCs included in the balloon display azimuth range of the PC (YES in Step S137), the processing target decision unit 203 decides an NPC having the closes distance from the PC among the specified NPCs as the processing target, and the information processing unit 204 displays the balloon above the NPC (Step S139).

On the other hand, when there is the NPC including the PC in the balloon display area but there is no NPC included in the balloon display azimuth range of the PC (NO in Step S136), an NPC having the closes distance from the PC is decided as the processing target among the specified NPCs, that is, the NPCs including the PC in the balloon display area, and the information processing unit 204 displays the balloon above the NPC (Step S139).

As described above, the balloon display is performed (Step S139) with respect to the NPC, which is the closest to the PC, as the processing target among the NPCs including the PC in the balloon display area (Step S131) even when there is no NPC included in the balloon display azimuth range of the PC (NO in Step S136) in the game according to the present embodiment processing method. In addition, when there is only one NPC including the PC in the balloon display area (YES in Step S131 and NO in Step S132), the balloon is displayed above the NPC (Step S133) regardless of whether the NPC is present in the balloon display azimuth range of the PC, and thus, the balloon is displayed above the NPC including the PC in the balloon display area even when there is no NPC included in the balloon display azimuth range of the PC.

When any one NPC is not present on the side of the gaze direction of the PC, the balloon is displayed above the NPC if there is one NPC including the PC in the balloon display area (that is, within a predetermined distance) on a side different from the gaze direction of the PC, and the balloon is displayed above an NPC which is the closest to the PC if there are a plurality of the NPCs. When there is no NPC on the side in the gaze direction of the PC, the balloon is displayed above an NPC as long as there is the NPC even if it is the side different from the gaze direction of the PC. However, when an NPC is present on the side in the gaze direction of the PC, the balloon is preferentially displayed above such an NPC, and thus, there is a case where the balloon is displayed above an NPC on a side that the PC does not face when there is no such an NPC while maintaining a natural operation that the balloon is displayed above the NPC on the side that the PC faces, as the principle, thereby increasing a chance that the balloon is displayed for the NPC, that is, a change that the user contacts the NPC.

Modified Example

Although the embodiment of the present disclosure has been described above, the present invention is not limited to the above-described embodiment, and various modifications can be made. For example, a premise that an NPC satisfies the second condition is set and the NPC that further satisfies the first condition is preferentially selected as the processing target than the NPC that does not satisfy the first condition in the above-described embodiment, but the second condition is not necessarily imposed as the condition to select the processing target. In this case, the processing target decision unit 203 may select and decide an NPC, which is the closest to the PC among NPCs that satisfy the first condition, as the processing target. In this case, an NPC present on the side in the gaze direction of the PC is preferentially selected as the processing target, and an NPC which is not in the gaze direction of the PC is selected as the processing target when there is no NPC on the side. In addition, the second condition may be substituted by a condition that an NPC appears in the game screen or that an NPC appears with a size that is equal to or larger than a predetermined size.

Further, when there are a plurality of NPCs that similarly satisfy the conditions, the NPC having the closest distance from the PC is selected and decided as the processing target in the above-described embodiment, but all the plurality of NPCs that satisfy the conditions may be decided as the processing targets when there are the plurality of NPCs that similarly satisfy the conditions. That is, the processing target decision unit 203 decides only one NPC as the processing target in the above-described embodiment, but may select and decide a plurality of NPCs as the processing targets. Further, even when one NPC is decided as the processing target, the processing target may be decided based on the size of the NPC or a property assigned to the NPC without being limited to the distance from the PC. For example, it may be configured such that an NPC as human is decided as the processing target when properties such as an animal and the human are set and two NPCs as the human and the animal satisfy the condition.

In addition, the balloon display azimuth range R according to the above-described embodiment is the range at 180 degrees having the gaze direction of the PC as the center thereof, but the center of the balloon display azimuth range is not limited to the gaze direction, and for example, the progressing direction of the PC may be set as the center of the balloon display azimuth range or the balloon display azimuth range may be set behind the PC. In addition, a size of the balloon display azimuth range is not limited to 180 degrees, and may be set to be larger or smaller than the size. Further, the gaze direction of the PC or the progressing direction does not necessarily serve as the center, and for example, may be set to be different such as 90 degrees on the right and 60 degrees on the left of the gaze direction.

Figure 14:
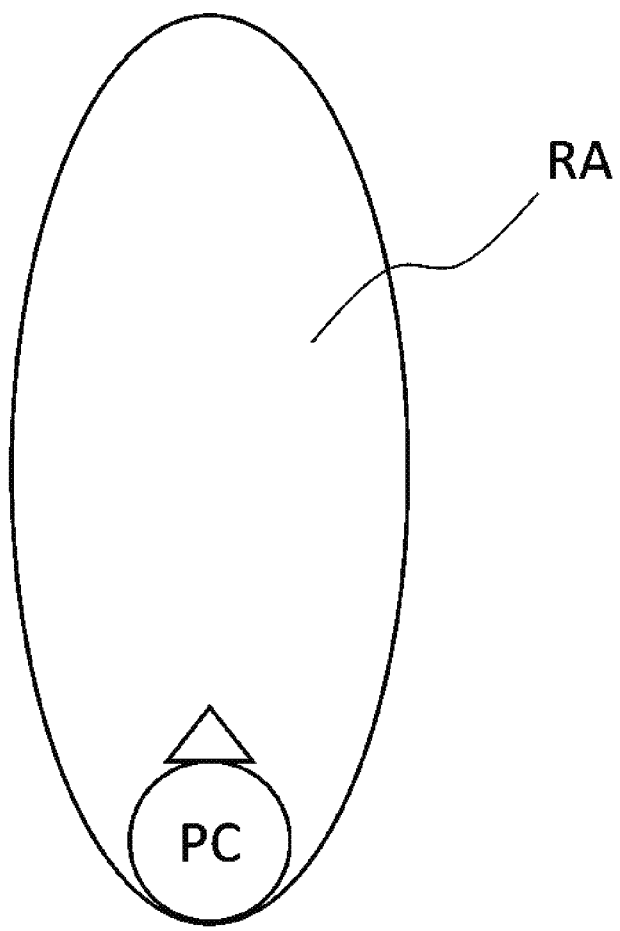
FIG. 14 is a diagram illustrating a first condition determination area according to a modified example of the embodiment.
Figure 15:
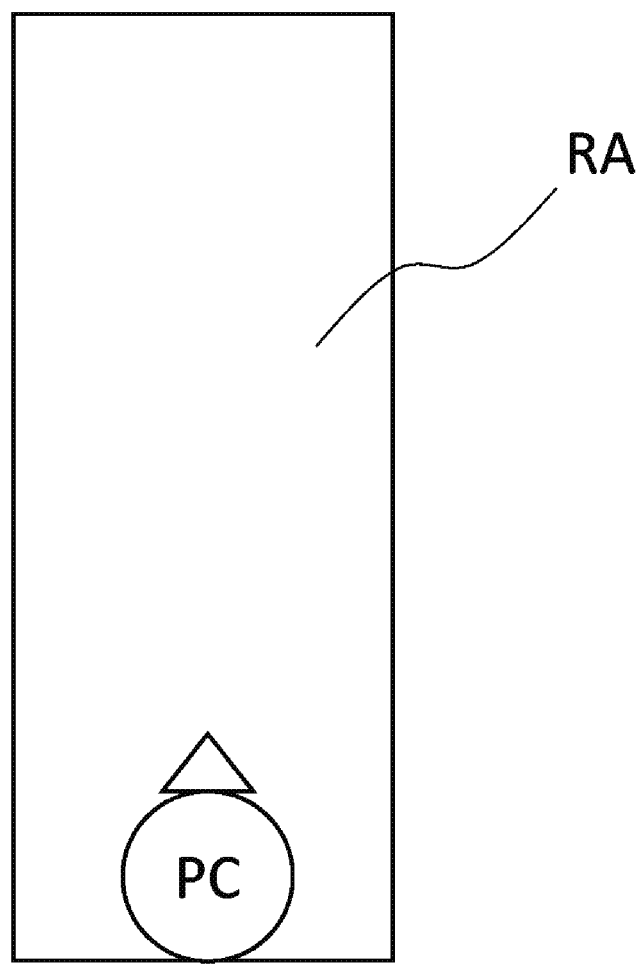
FIG. 15 is a diagram illustrating the first condition determination area according to a modified example of the embodiment.
Figure 16:
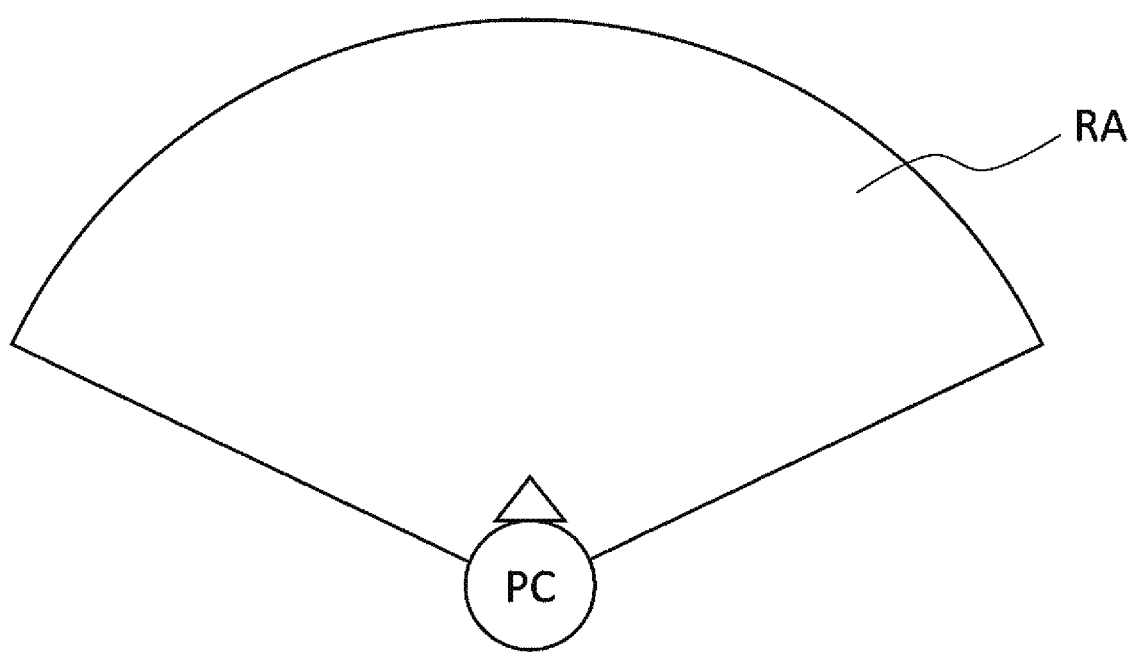
FIG. 16 is a diagram illustrating a first condition determination area according to a modified example of the embodiment.

In addition, the range set as the first condition may be a closed area (first condition determination area), and the first condition determination area RA may be expressed, for example, in an oval shape having a larger area on the font side of the PC as illustrated in FIG. 14, a rectangular shape having a larger area in front of the PC as illustrated in FIG. 15, or another shape. Alternatively, the first condition determination area RA may be the range set as the first condition formed in a fan shape having a coordinate of the PC as the center as illustrated in FIG. 16. In these cases, an NPC, which is in the gaze direction of the PC or the progressing direction but separated as much as exceeding the first condition determination area RA in the oval shape, the rectangular shape, the fan shape or the like, does not satisfy the first condition. Incidentally, the triangle expressed in FIGS. 14 to 16 represents that a direction thereof is the gaze direction of the PC.

In addition, the information processing performed with respect to the decided processing target is the processing to additionally display the balloon on the graphic of the NPC as the processing target in the above-described embodiment, but the information processing with respect to the decided processing target is not limited thereto, and for example, may be processing to cause the NPC to attack the PC or cause the NPC to move in a predetermined direction (a direction of approaching the PC, a direction of separating from the PC, or the like).

In addition, the description has been given in the above-described embodiment by exemplifying the case where the information processing system is applied as the game system, but the present invention can be also applied to an information processing system that performs different information processing other than the game. For example, the present invention can be also applied to a chat system in which avatars indicating a user and other uses are arranged inside a virtual space.

As described above, it is possible to remove unnaturalness caused when the information processing is performed with respect to an NPC that is not present inside the azimuth range by selectin the processing target among NPCs when there are the NPCs inside the azimuth range set using the PC as the reference, and it is possible to increase the change to perform the information processing with respect to the NPC by allowing the processing target to be selected and decided among NPCs that are not present inside the azimuth range set using the PC as the reference when there is no NPC inside the azimuth range set using the PC as the reference according to the game system 100 or the game device 20 according to the present embodiment.

FIG. 2
30 DISPLAY DEVICE
20 GAME DEVICE
24 STORAGE UNIT
23 READING UNIT
26 IMAGE MEMORY
25 MAIN MEMORY
28 IMAGE GENERATION UNIT

27 GAME CALCULATION UNIT
10 CONTROLLER
12 OPERATING MEMBER
FIG. 3
SIMPLE CONVERSATION AREA
FIG. 4
WELCOME TO XX TOWN
FIG. 5
1 NORMAL CONVERSATION AREA
2 EMOTION AREA
FIG. 8
IT SEEMS LIKE TURMOIL IS HAPPENING IN CENTRAL SQUARE.
FIG. 9
CHOICE 1
CHOICE 2
CHOICE 3
CHOICE 4
FIG. 10
201 FIRST DETERMINATION UNIT
202 SECOND DETERMINATION UNIT
203 PROCESSING TARGET DECISION UNIT
204 INFORMATION PROCESSING UNIT
FIG. 13
1 START
S131 IS THERE PC IN BALLOON DISPLAY AREA OF NPC?
S132 IS CORRESPONDING NPC PLURAL?
S133 DISPLAY BALLOON ABOVE CORRESPONDING NPC
S134 IS THERE ANY NPC SET WITH PRIORITY AMONG PLURALITY OF NPCS?
S135 DISPLAY BALLOON ABOVE NPC SET WITH PRIORITY
S136 IS THERE NPC INCLUDED IN BALLOON DISPLAY AZIMUTH RANGE OF PC AMONG PLURALITY OF NPCS?
S137 IS CORRESPONDING NPC PLURAL?
S138 DISPLAY BALLOON ABOVE CORRESPONDING NPC
S139 DECIDE NPC HAVING CLOSEST DISTANCE FROM PC AS PROCESSING TARGET AMONG SPECIFIED NPCS AND DISPLAY BALLOON ABOVE CORRESPONDING NPC
2 END

What is claimed is:

1. A non-transitory storage medium having stored therein an information processing program causing a computer of an information processing device to provide execution comprising:
    determining whether a non-player object inside a virtual space satisfies a first condition that the non-player object is present in a front direction set using a player object inside the virtual space as a reference;
    determining whether the non-player object inside the virtual space satisfies a second condition that the non-player object is present within a specified distance between the player object and the non-player object in the virtual space;
    deciding the non-player object that satisfies the first condition as a processing target when there is the non-player object that satisfies the first condition, and deciding the non-player object that does not satisfy the first condition, but satisfies the second condition, as the processing target when there is no non-player object that satisfies the first condition;
    performing predetermined information processing with respect to the non-player object decided as the processing target; and
    generating, for display on a display device, an image including a dialogue portion, associated with dialogue between the player object and the non-player object, based on the predetermined information processing.

2. The non-transitory storage medium according to claim 1, wherein
    the direction set as a reference in the first condition is changed depending on a change of a direction of the player object.

3. The non-transitory storage medium according to claim 1 further causing the computer of the information processing device to provide execution comprising:
    determining whether a non-player object inside the virtual space satisfies a second condition of having a predetermined positional relationship with the player object,
    wherein a non-player object that satisfies the second condition is decided as the processing target.

4. The non-transitory storage medium according to claim 3, wherein
    the predetermined positional relationship is a relationship that the player object is present in a predetermined area set around the non-player object.

5. The non-transitory storage medium according to claim 4, wherein
    the virtual space includes a plurality of the non-player objects, and
    the predetermined area is set individually for each of the plurality of non-player objects.

6. The non-transitory storage medium according to claim 1, wherein
    when a plurality of non-player objects satisfy the first condition, a non-player object having a distance closer to the player object among the non-player objects that satisfy the first condition is decided as the processing target.

7. The non-transitory storage medium according to claim 1, wherein
    the predetermined information processing includes outputting information to be displayed in addition to the non-player object as the processing target.

8. The non-transitory storage medium according to claim 7, wherein
    the information relates to pseudo-conversation between the player object and the non-player object as the processing target.

9. The non-transitory storage medium according to claim 8, wherein
    the information indicates possibility of the pseudo-conversation.

10. The non-transitory storage medium according to claim 1, wherein
    whether to be preferentially decided as the processing target is set for the non-player object, and
    when there is a non-player object to be preferentially decided as the processing target, the non-player object is decided as the processing target regardless of whether the first condition is satisfied.

11. A non-transitory storage medium having stored therein an information processing program causing a computer of an information processing device to provide execution comprising:
    determining whether a non-player object inside a virtual space satisfies a first condition that the non-player object is present in a front direction set using a player object inside the virtual space as a reference;

determining whether a non-player object inside the virtual space satisfies a second condition that the non-player object has a predetermined positional relationship, as being present within a specified distance, with the player object;

deciding the non-player object that satisfies both the first condition and the second condition as a processing target when there is the non-player object that satisfies both the first condition and the second condition, and deciding the non-player object that satisfies the second condition as the processing target when there is no non-player object that satisfies both the first condition and the second condition;

performing predetermined information processing with respect to the non-player object decided as the processing target; and generating, for display on a display device, an image including a dialogue portion, associated with dialogue between the player object and the non-player object, based on the predetermined information processing.

12. An information processing device, comprising:
a processor; and
a memory configured to store computer readable instructions that, when executed by the processor, cause the information processing device to:
  determine whether a non-player object inside a virtual space satisfies a first condition that the non-player object is present in a front direction set using a player object inside the virtual space as a reference;
  determine whether the non-player object inside the virtual space satisfies a second condition that the non-player object is present within a specified distance between the player object and the non-player object in the virtual space;
  decide the non-player object that satisfies the first condition as a processing target when there is the non-player object that satisfies the first condition, and decide the non-player object that does not satisfy the first condition, but satisfies the second condition, as the processing target when there is no non-player object that satisfies the first condition;
  perform predetermined information processing with respect to the non-player object decided as the processing target; and
  generate, for display on a display device, an image including a dialogue portion, associated with dialogue between the player object and the non-player object, based on the predetermined information processing.

13. An information processing system, comprising:
a display device; and
processing circuitry including at least one processor, the processing circuitry operatively coupled to the display device and configured to:
  determine whether a non-player object inside a virtual space satisfies a first condition that the non-player object is present in a front direction set using a player object inside the virtual space as a reference;
  determine whether the non-player object inside the virtual space satisfies a second condition that the non-player object is present within a specified distance between the player object and the non-player object in the virtual space;
  decide the non-player object that satisfies the first condition as a processing target when there is the non-player object that satisfies the first condition, and decide the non-player object that does not satisfy the first condition, but satisfies the second condition, as the processing target when there is no non-player object that satisfies the first condition;
  perform predetermined information processing with respect to the non-player object decided as the processing target; and
  generate, for display on the display device, an image including a dialogue portion, associated with dialogue between the player object and the non-player object, based on the predetermined information processing.

14. An information processing method, comprising:
determining whether a non-player object inside a virtual space satisfies a first condition that the non-player object is present in a front direction set using a player object inside the virtual space as a reference;

determining whether the non-player object inside the virtual space satisfies a second condition that the non-player object is present within a specified distance between the player object and the non-player object in the virtual space;

deciding the non-player object that satisfies the first condition as a processing target when there is the non-player object that satisfies the first condition, and deciding the non-player object that does not satisfy the first condition, but satisfies the second condition, as the processing target when there is no non-player object that satisfies the first condition;

performing predetermined information processing with respect to the non-player object decided as the processing target; and generating, for display on a display device, an image including a dialogue portion, associated with dialogue between the player object and the non-player object, based on the predetermined information processing.

15. The non-transitory storage medium according to claim 1, wherein the first condition is satisfied by the non-player object being present in an azimuth range which spreads to right and left with the front direction positioned as the center thereof.

16. The information processing device according to claim 12, wherein the first condition is satisfied by the non-player object being present in an azimuth range which spreads to right and left with the front direction positioned as the center thereof.

17. The information processing system according to claim 13, wherein the first condition is satisfied by the non-player object being present in an azimuth range which spreads to right and left with the front direction positioned as the center thereof.

18. The information processing method according to claim 14, wherein the first condition is satisfied by the non-player object being present in an azimuth range which spreads to right and left with the front direction positioned as the center thereof.

19. The non-transitory storage medium according to claim 1, wherein the first condition includes a condition that the non-player object be within a predefined distance from the player object in addition to the non-player being present in the front direction set using the player object.

20. The non-transitory storage medium according to claim 1, wherein the front direction includes a gaze direction of the player object.

* * * * *